May 31, 1927. 1,631,061
C. H. RANKIN
APPARATUS FOR CONTROLLING THE FLOW OF MOLTEN GLASS
THROUGH A DISCHARGE APERTURE
Filed Nov. 20, 1926

INVENTOR
Curt H. Rankin
BY
James L. Norris
ATTORNEY

Patented May 31, 1927.

1,631,061

UNITED STATES PATENT OFFICE.

CARL HENRY RANKIN, OF WELLSBURG, WEST VIRGINIA.

APPARATUS FOR CONTROLLING THE FLOW OF MOLTEN GLASS THROUGH A DISCHARGE APERTURE.

Application filed November 29, 1926, Serial No. 151,453, and in Great Britain December 1, 1925.

This invention relates to apparatus for controlling the flow of molten glass through a discharge aperture, of the kind comprising a discharge cup having a discharge aperture in the floor thereof, a reciprocatory plunger, rotary screw or like propelling element and a tube or sleeve surrounding and spaced apart from the said plunger or like propelling element and movable towards and away from a seat on the floor of the discharge cup around the discharge aperture.

In such apparatus it has been known to provide a propelling element or plunger which is continuously or intermittently moved towards and away from the discharge aperture whilst the sleeve is independently moved in order to vary the space through which the molten glass can flow between the floor of the discharge cup and the sleeve which thus serves as a dross trap as well as a weir or regulator of the quantity of glass flowing into the discharge aperture, and also serves, by adjustment of its position, to vary the dimensions of the chamber within which the plunger is movable, thereby effecting a control of the propulsive effect exerted by the plunger on the glass in front of or beneath it as it is moved towards the discharge aperture in the floor of the discharge cup.

Heretofore it has been proposed to impart to the sleeve and plunger, or either of them, rotary motion about the axis along which they are movable to and from the discharge aperture, and the sleeve has heretofore been constructed with smooth interior and exterior walls of cylindrical shape.

According to this invention the walls of the tube, exteriorly or interiorly, are corrugated or have ribs, grooves or beads formed thereon in order to increase the effect of the adhesion between the said sleeve and the molten glass into which it dips, so as to augment the stirring effect if the sleeve is rotated, or to increase the propelling or lifting action of the sleeve upon the glass, when the said sleeve is moved in the direction of its axis towards or away from the discharge aperture.

In the case of a construction wherein the plunger and the sleeve are both movable axially and the sleeve or the plunger alone, or both the sleeve and the plunger, in addition, have a rotary movement about the longitudinal axis on which they are moved towards and away from the floor of the discharge cup, the sleeve either on its interior wall, or its exterior wall or both walls, is provided with longitudinal ribs, corrugations or beads increasing the adhesion between the sleeve and the glass in contact therewith, and consequently increasing or modifying the stirring effort exerted on the glass by the rotation of the sleeve, or the rotation of the plunger, if the latter is rotated within the sleeve.

In the improved apparatus hereinabove referred to it may also be advantageous to provide the lining of the discharge aperture with corrugations, ribs or beads arranged in an axial, circumferential or spiral direction.

In the accompanying drawing which shows how the said invention can be conveniently and advantageously carried into practice :—

Figure 1:
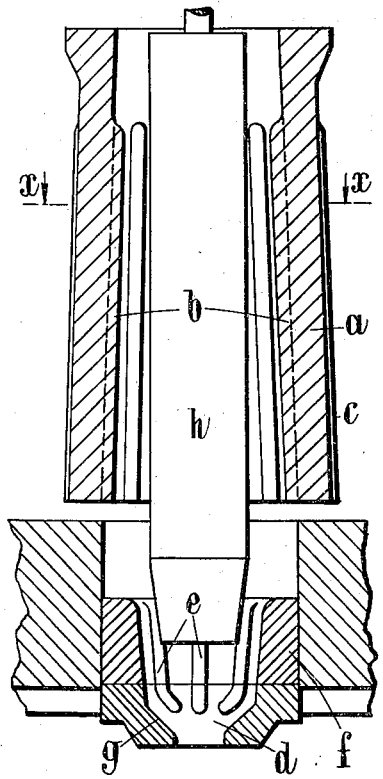
Figure 1 is a vertical section showing a sleeve and discharge cup constructed in accordance with this invention with a plunger arranged therein.
Figure 2:
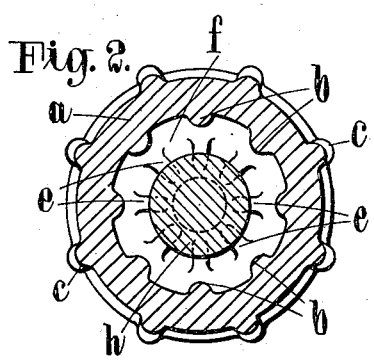
Figure 2 shows a section on the line x—x, Figure 1.

As shown in Figures 1 and 2, the sleeve a is provided with ribs or beads b on its internal wall and ribs or beads c on its external wall. In like manner the interior wall of a discharge aperture d in combination with which the sleeve a is provided, has longitudinal corrugations e extending from the upper part of a liner f to a distance short of the constriction g at the lower part of this liner. The sleeve a is arranged around the plunger h and may be formed with cylindrical walls or, as shown, conical walls may be provided, the lower end of the sleeve being preferably of larger diameter than the upper end thereof. The corrugations, ribs or beads $b$, $c$ and $e$ need not be of regular form or arrangement.

The invention can be applied to apparatus comprising a rotating propelling screw $h'$ instead of a reciprocatory rotary or non-rotary plunger, wherein the molten glass is propelled through the discharge orifice by the action of the screw.

Figure 3:
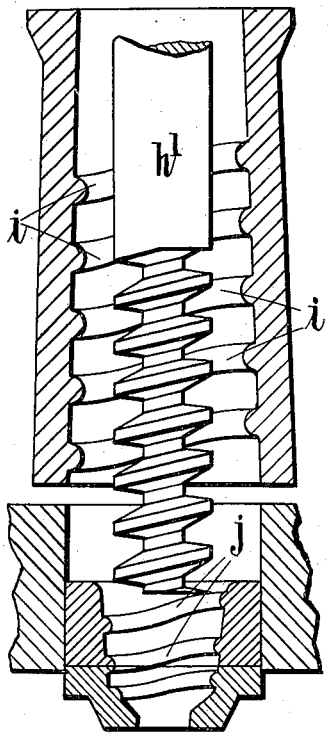
Figure 3 shows a vertical section of a sleeve and discharge cup illustrating a modified arrangement.

The sleeve can be rotary or it can be held against rotation and can be adjustable or have a reciprocatory movement towards and away from the floor of the discharge cup. The interior wall of the sleeve may be of cylindrical or conical form and, as shown in Figure 3, can be provided with spiral grooves, ribs or beads $i$. In the case of a rotary sleeve the spirals may be in the same or in the opposite direction to the rotary movement of the sleeve. If desired spiral beads or ribs $j$ can be also provided on the interior wall of the discharge aperture. In this case, so long as the sleeve is stationary, the ribs by increasing the surface in contact with the glass operate to prevent the glass from rotating with the screw and thereby increase its propelling effect. By rotating the sleeve either in the same or in the opposite direction to the screw the propelling effect of the latter can be variously and variably modified. By providing ribs or beads having a spiral formation and reciprocating the sleeve axially a rotary motion can be imparted to the glass in the glass containing vessel.

Figure 4:
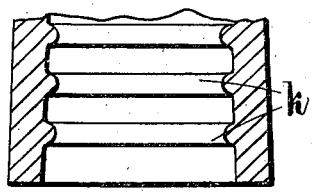
Figure 4 shows a partial vertical longitudinal section of another constructional form of the sleeve.

The sleeve can however be provided either interiorly or exteriorly or both interiorly and exteriorly with circular ribs or beads $k$ as shown in Figure 4. When ribs or beads either in the form of screw threads or circular bands are provided on the exterior or interior of the sleeve the latter in moving axially operates to lift or to force down the glass close to the sleeve thereby setting up a circulatory movement of the glass in a discharge cup or other vessel in which the glass is contained and thereby the glass is maintained at a more uniform temperature in all parts of the said vessel.

Figure 5:
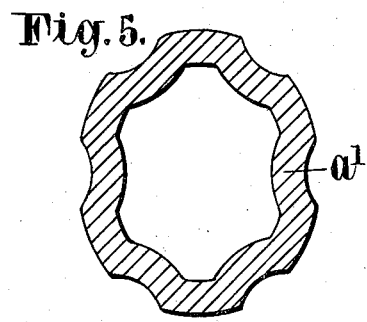
Figure 5 shows a horizontal section of a sleeve embodying a further modification.
Figure 6:
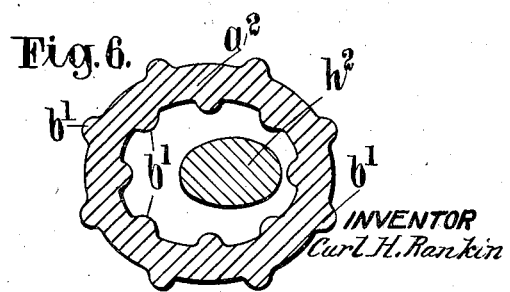
Figure 6 shows a horizontal section of a sleeve and plunger also comprised in the said invention.

Instead of providing a cylindrical or conical sleeve the said sleeve can be made of an irregular, oval, polygonal or other convenient shape, either in cross-section or in longitudinal section, to serve substantially the same purpose. Thus a sleeve $a'$ can be provided having a wavy, non-circular form as shown in Figure 5 or it may be of a regular oval form as shown by the sleeve $a^2$ in Figure 6 with longitudinal ribs, or beads $b'$.

In apparatus of the kind to which the invention relates it has heretofore been usual to arrange the sleeve concentrically with the plunger which is movable coaxially with the discharge orifice but this is not essential and if required a plunger $h^2$ which may be rotatable as well as axially movable may be arranged eccentrically in a sleeve of oval, cylindrical or conical cross section.

I claim:

1. In apparatus for controlling the flow of molten glass through a discharge aperture, the combination of a plunger arranged in axial alignment with the said aperture, a sleeve surrounding and spaced apart from the said plunger, and corrugations on the interior wall of the said sleeve.

2. In apparatus for controlling the flow of molten glass through a discharge aperture, a plunger arranged in axial alignment with the said aperture, a sleeve surrounding and spaced apart from the said plunger and corrugations on the exterior wall of the said sleeve.

3. In apparatus for controlling the flow of molten glass through a discharge aperture, a liner having the said discharge aperture formed therein, corrugations on the interior wall of the said aperture, a plunger arranged in axial alignment with the said aperture, a sleeve arranged coaxially with the plunger to enclose an annular space around the said plunger and corrugations on the interior wall of the said sleeve.

4. In apparatus for controlling the flow of molten glass through a discharge aperture, the combination of means for propelling the molten glass through the said aperture, a sleeve arranged coaxially with the discharge aperture and enclosing a space within which the said propelling means operate, and corrugations on the wall of said sleeve.

5. In apparatus for controlling the flow of molten glass through a discharge aperture, a liner having the discharge aperture formed therein, corrugations on the wall of the said aperture, means for propelling the molten glass through the said aperture, and a rotary sleeve surrounding the said propelling means, and spiral corrugations formed on the interior wall thereof.

6. In apparatus for controlling the flow of molten glass through a discharge aperture, the combination of a liner having the discharge aperture formed therein, a plunger arranged in axial alignment with the said aperture and a sleeve having a wavy non-circular form in cross section movably supported around the said plunger.

7. In apparatus for controlling the flow of molten glass through a discharge aperture, the combination of a rotary and axially movable plunger having corrugations thereon, a rotary axially movable sleeve surrounding the said plunger, and corrugations on the wall of the said sleeve.

8. In apparatus for controlling the flow of molten glass through a discharge aperture, the combination of a liner having the said aperture formed therein, corrugations on the wall of the said aperture, a rotary and axially movable plunger arranged in alignment with the said aperture, and a rotary and axially movable sleeve surrounding and spaced apart from said plunger.

9. In apparatus for controlling the flow of molten glass through a discharge aperture, the combination of a member having the said aperture formed therein, a rotary and axially movable plunger, a rotary and axially movable sleeve around said plunger and spaced apart therefrom, and corrugations on the wall of the said sleeve.

CARL HENRY RANKIN.